June 6, 1961 C. H. M. ROBERTS ET AL 2,987,614

SECRECY VOICE RADIO COMMUNICATION SYSTEM

Filed Feb. 6, 1952 2 Sheets-Sheet 1

INVENTORS.
Claudius H. M. Roberts
Wilbur S. Hinman, Jr.
BY
G. J. Kessenich & A. W. Dew
Attorneys.

INVENTORS.
Claudius H.M.Roberts
BY W.S.Hinman, Jr.
G.J. Kessenich & A.W. Dew
ATTORNEYS.

United States Patent Office 2,987,614

Patented June 6, 1961

2,987,614
SECRECY VOICE RADIO COMMUNICATION SYSTEM

Claudius H. M. Roberts, Washington, D.C., and Wilbur S. Hinman, Jr., Falls Church, Va., assignors to the United States of America as represented by the Secretary of the Army Filed Feb. 6, 1952, Ser. No. 270,267
1 Claim. (Cl. 250—6)
(Granted under Title 35, U.S. Code (1952), sec. 266)

The invention described in the specification and claims may be manufactured and used by or for the Government for governmental purposes without the payment to use of any royalty thereon.

This invention relates to a system and means of radio communication not subject to easy interception or immediate interpretation of messages transmitted thereby. Such systems may be used by air, ground or sea units, but are most likely to be employed by personnel who are aboard vessels or aircraft or who are in military vehicles, communication centers, command posts or the like.

An object of the invention is a relatively inexpensive coded voice radio transmitting and receiving system affording little or no work to encipher the clear or to decipher the coded message.

Another object of the invention is a secrecy voice radio communication system usable by unskilled communications personnel.

Another object of the invention is a secrecy voice radio communication system that will make maximum use of available transmitting power and provide a high signal-to-noise ratio.

A further object of the invention is a secrecy voice radio communication system wherein no appreciable time lag occurs in encipherment and decipherment, and little or no mental or manual effort will be required by the using personnel.

It is contemplated that the device of the invention will be of great tactical use in such military vehicles as tanks, aircraft and the like where voice transmission should be accomplished without delay in order that missions may be carried out, yet that such transmissions be not readily understood by unauthorized intercepting stations.

It is acknowledged that many cryptograph machines using letter substitution and a few machines using letter transposition have been devised. Also, there are various methods of scrambling and unscrambling speech. These have met with considerable success, but do not afford all the advantages inherent in the system of the invention. There is also a telegraphic code transmission system wherein the message is compressed at the time of transmission and expanded after reception. This method was used by the German military during World War I. While it afforded security for a time, it also lacked certain features of the present invention.

The invention incorporates coded speech with a high efficiency of pulse transmission, the coding being accomplished by compressing the speech from its original form into a series of pulses, each of which may be only a few milliseconds. Such pulses will be referred to as "compressed message pulses." Use of this type of transmission also effects reduction of interference.

The invention resides in utilizing a pulse transmitter with an appropriate receiver and enclosing intelligence in each pulse, preferably in the form of speech, which would normally require an interval many times the duration of the pulse for normal transmission.

The specific nature of the invention as well as other objects and advantages thereof will clearly appear from the following description and accompanying drawings in which.

Figure 1:
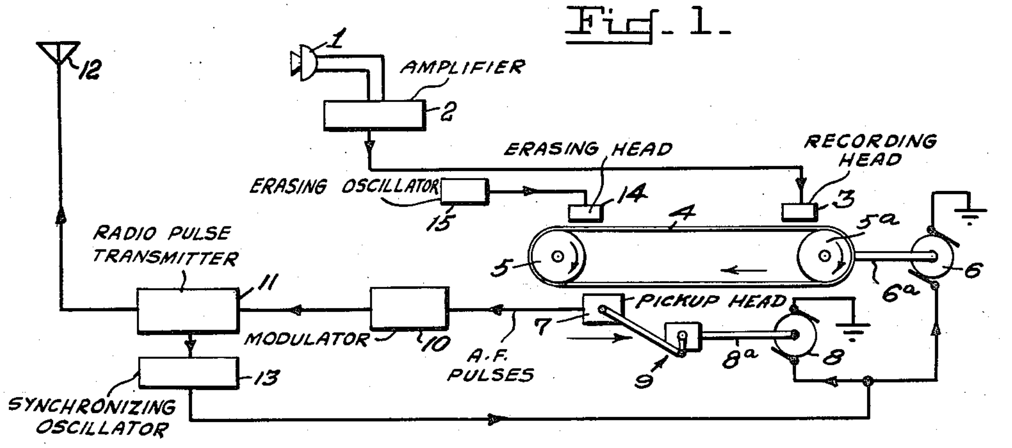
FIGURE 1 is a schematic diagram of the voice transmitter of the system.

Referring now to FIGURE 1 of the drawings wherein 1 indicates a microphone connected to the input circuit of an amplifier 2. The output circuit of the amplifier 2 is connected to an electromagnetic recording head 3 which is suitably positioned in fixed relationship to a magnetic type of recording tape 4. The tape 4 is mounted on spaced drums 5 and **5*a* and is rotated in a direction indicated by the arrows on the drums. The drum 5*a* is driven by a synchronous motor 6 coupled to the drum in any conventional manner as, for example, by shaft 6*a*. The words are written on tape 4 as sequences of magnetized and unmagnetized spots by means of the recording head 3 and are read by an electromagnetic pickup 7 positioned at a fixed distance from tape 4 adjacent the drum 5. The synchronous motor 8 through the reciprocating means 9 imparts a reciprocating motion to the electromagnetic pickup head 7 which when driven in a direction opposite to the travel of the tape reads a predetermined length of the tape. The synchronous motor 8 may be coupled to the reciprocating means 9 by a shaft 8*a*. A cutoff means, not shown, incorporated in head 7** opens the pickup circuit when the head is traveling in the direction of the tape travel.

The output of pickup head 7 is coupled to a modulator 10, the output of which is coupled to a radio pulse transmitter 11 for the purpose of modulating the pulses generated by the pulse transmitter 11 which is coupled to an antenna 12. A synchronizing oscillator 13 has its input circuit connected to the pulse transmitter 11 and its output circuit to the motors 6 and 8 for the purpose of controlling the speed of the motors and synchronizing the movement of the pickup head 7 with the transmitter pulses.

In operation the operator speaks into the microphone thereby generating audio frequency currents which are amplified by the amplifier 2 and transmitted to the recording head 3. The recording head impresses the audio frequencies upon the moving magnetic tape member. The tape is read by means of the pickup 7 which when traveling in a direction parallel, but opposite to that of the tape reduces the length of time of the message and thereby compressing the speech of the operatior from its original form to a point where it is completely unintelligible to an interception station not equipped with suitable synchronizing and expanding means. The output of the pickup head 7, therefore, consists of a series of compressed message pulses. The motion of the pickup head is so timed by means of the reciprocating means 9 and the synchronizing oscillator 13 that the operator can talk uninterruptedly. When that portion of the tape containing the message has passed the pickup, it is subsequently positioned opposite the erasing head 14 which in combination with the erasing oscillator 15 removes the message from the tape.

It will be seen from the previous description and FIGURE 1 that an item of oral intelligence is impressed upon a moving recording tape in a normal time period, and that, at intervals determined by the synchronizing oscillator which is triggered by the pulses of the pulse transmitter, such item of intelligence is read off the tape by accelerated motion of the pickup head in a much shorter time interval than was required to record that intelligence. By any of a number of well known means, the synchronizing oscillator 13 is adapted in cooperation with the transmitter 11 and the motors 6 and 8 so that the pickup arm 7 moves opposite to the travel of the tape in synchronization with the transmitted pulses. Likewise, it will readily be understood that the amount of compression achieved may also be controlled by having the oscillator output control the speeds of motors 6 and 8.

Figure 2:
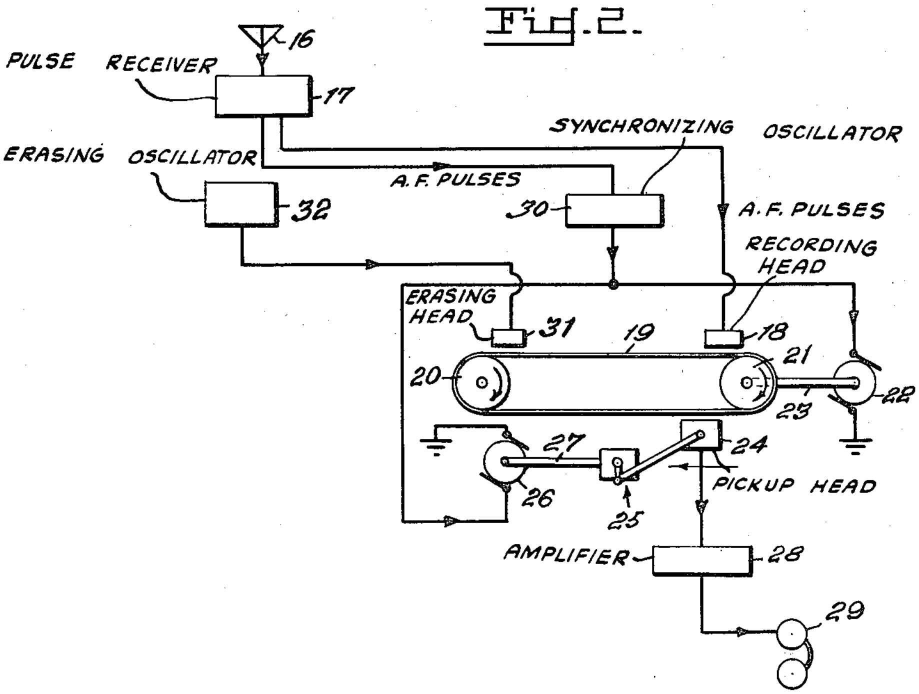
FIGURE 2 is a schematic diagram of the voice receiver of the system.

The receiving means of the system is shown in block diagram in FIGURE 2 wherein 16 is an antenna connected to a radio pulse receiver 17 for the reception of the pulse signals transmitted by the pulse transmitter 11. The audio frequency output of the receiver 17 is coupled to an electromagnetic recording head 18 which is in fixed relationship to a magnetic type of recording tape 19. The recording tape 19 is mounted on two spaced drums 20 and 21 and rotated thereon by drum 21 which is driven by a synchronous motor 22 through coupling means 23 in a direction as shown by the arrows on the drums.

A magnetic pickup head 24 is positioned at a fixed distance from the tape 19 on which is recorded the compressed message pulses containing the intelligence received by the receiver 17 from the transmitter 11. The pickup head 24 is moved parallel to and in the same direction as the recording tape 19, when reading the tape, through means of the reciprocating means 25 coupled by coupling means 27 to motor 26 which is controlled by the synchronizing oscillator 30. The relative velocities of the pickup head and tape are such that compressed intelligence contained in the pulses is expanded to its original form. The audio frequency amplifier 28 couples the output of the pickup head to the transducer 29. The pickup head 24 has means, not shown, incorporated therein to open the pickup circuit when the head is traveling in a direction opposite to that of the tape travel.

The audio frequency output of the receiver 17 is also connected to the synchronizing oscillator 30 which in turn is connected to the synchronous motors 22 and 26. This oscillator, in response to pulse signals received by the receiver, is adapted, by any of a number of well known means, to control the speed of the motors 22 and 26 to move the tape and pickup head in synchronism with the duration and time spacing of the received pulses so as to obtain expansion of the compressed message pulses to their original form. An erasing oscillator 32 drives an erasing head 31 to demagnetize the tape 19 after the tape has been read by the magnetic pickup 24.

Figure 3:
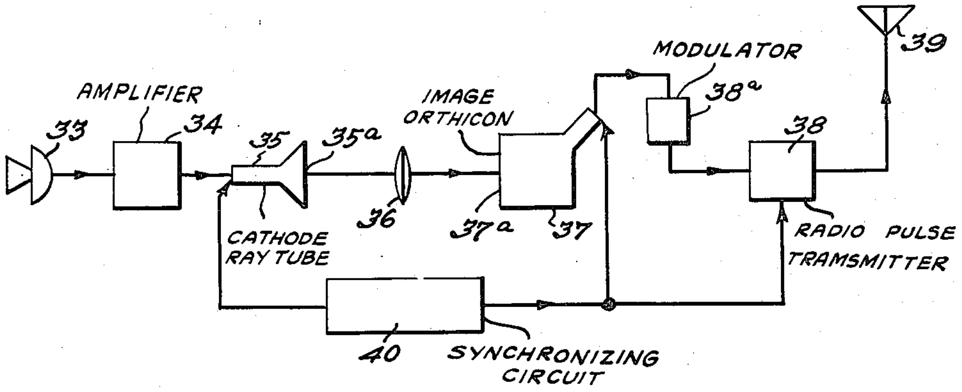
FIGURE 3 is a schematic diagram of an electronic analog of the voice transmitter of FIGURE 1.
Figure 4:
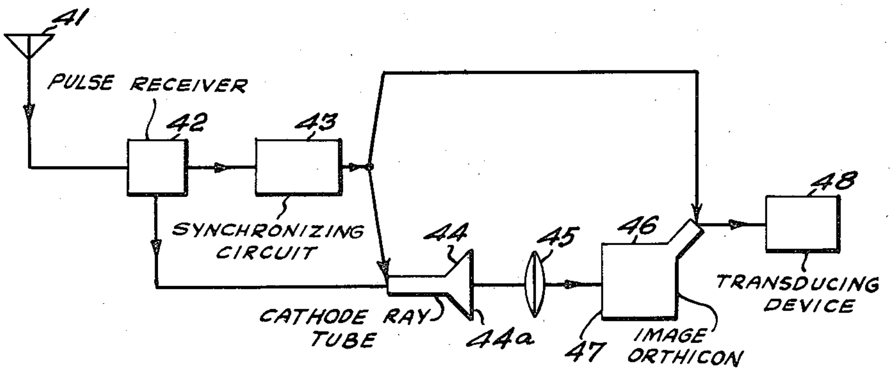
FIGURE 4 is a schematic diagram of an electronic analog of the voice receiver of FIGURE 2.

Another embodiment is illustrated in FIGURES 3 and 4 wherein an electronic analog of the invention in FIGURES 1 and 2 is shown. Referring to FIGURE 3, a message is spoken into a microphone 33 which feeds an amplifier 34, the output of which appears on a screen 35*a* of a cathode ray tube 25. The image from screen 35*a* of this tube is projected through lens system 36 to the mosaic 37*a* of an image orthicon 37 or similar television camera means. The output of the orthicon 37 is fed into a modulator 38*a* which is connected to a radio pulse transmitter 38 coupled to an antenna means 39. A synchronizing circuit 40 controls the sweep frequencies of the iconoscope 35 and the image orthicon 37, as well as, the pulse rate of transmitter 38. The iconoscope and image orthicon are synchronized by the synchronizing circuit 40 in such relationship that the charge on the mosaic 37*a* of the orthicon will be picked off by the electric beam of the orthicon in a small fraction of the time required for the trace to appear on the screen of the iconoscope.

Referring now to FIGURE 4 wherein 41 indicates an antenna system and 42 the pulse receiver for receiving the pulses containing the coded oral intelligence transmitted by the means schematically shown in FIGURE 3. The output of the pulse receiver 42 is connected to a synchronizing circuit 43 and to a cathode ray tube 44. The trace produced on the screen 44*a* of the cathode ray tube by the output of the receiver is projected through a lens system 45 onto the mosaic 47 of an image orthicon 46. The output of the image orthicon 46 is fed to any suitable form of transducing device 48 such as a sound recorder, a headset, a loud speaker, etc. The synchronizing circuit 43 controls the sweep rates of the iconoscope and the image orthicon. The trace compressed in transmission and appearing as an extremely short trace on the cathode ray tube 44 is restored to its full width by the control sweep rate of the image orthicon 46.

It will be apparent that the embodiment shown is only exemplary and that various modifications can be made in construction and arrangement within the scope of the invention as defined in the appended claim. For example, magnetic tapes of finite length may be used in both, or either, the transmitter and receiver to provide permanent records of the communication. Other types of recorders may be used, for example: phonograph records, motion picture film, etc.

We claim:

A high efficiency secrecy voice radio communication system comprising in combination: at a first location, an antenna, a radio pulse transmitter having its output connected to said antenna, a modulator feeding said transmitter, a microphone for picking up a voice message, a magnetic recording head connected to said microphone, an endless magnetizable tape mounted on spaced drums and rotatable thereon, a first synchronous motor for driving one of said drums and causing rotation of said tape, said recording head being in a fixed space relationship to said tape so as to write said message thereon, a magnetic pickup head for reading the message written on said tape, a mechanical linkage driving said pickup head at a fixed distance from said tape in a reciprocating motion parallel to said tape, a second synchronous motor driving said linkage, and a synchronous oscillator cooperating with said transmitter and said first and second synchronous motors such that said pickup head reads said tape in synchronism with the radio pulses produced by said transmitter and only when the motion of said pickup head is opposite to the motion of said tape, said pickup head thereby producing a series of compressed message pulses at its output which are synchronized with the transmitter radio pulses, the output of said pickup head being fed to said modulator causing said compressed message pulses to modulate the radio pulses of said transmitter; and at a second location, a second antenna, a radio pulse receiver connected to said second antenna for receiving and detecting the modulate pulses transmitted by said transmitter, a second magnetic recording head connected to the output of said receiver, a second endless magnetizable tape mounted on second spaced drums and rotatable thereon, a third synchronous motor for driving one of said second drums and causing rotation of said second tape, said second recording head being in a fixed space relationship to said second tape so as to write said compressed message pulses thereon, a second magnetic pickup head for reading the compressed message pulses written on second tape by said second recording head, a second mechanical linkage driving said second pickup head at a fixed distance from said second tape in a reciprocating motion parallel to said second tape, a fourth synchronous motor driving said second linkage, a second synchronous oscillator cooperating with said receiver and said third and second synchronous motors such that said second pickup head reads said second tape in synchronism with the pulses received by said receiver and only when the motion of said second pickup head is in the same direction as the motion of said second tape, the relative speed between said second pickup head and said second tape being such that the output of said second pickup head consists of the compressed message pulses expanded to their original form, and means for transforming these expanded message pulses into audible sounds which can be heard at said second location.

References Cited in the file of this patent

UNITED STATES PATENTS

| | | |
|---|---|---|
| 1,624,596 | Hartley | Apr. 12, 1927 |
| 1,809,070 | Schapira | June 9, 1931 |
| 1,996,958 | Freund | Apr. 9, 1935 |
| 2,306,435 | Graham | Dec. 29, 1942 |
| 2,312,835 | Hansel | Mar. 2, 1943 |
| 2,321,611 | Moynihan | June 15, 1943 |
| 2,527,145 | Mitchell | Oct. 24, 1950 |
| 2,725,425 | Sziklai | Nov. 29, 1955 |
| 2,730,569 | Street | June 10, 1956 |
| 2,766,325 | Di Toro | Oct. 9, 1956 |
| 2,777,897 | Gretener | Jan. 15, 1957 |